United States Patent
Endo et al.

(10) Patent No.: US 9,479,249 B2
(45) Date of Patent: Oct. 25, 2016

(54) OPTICAL TRANSMISSION SYSTEM AND OPTICAL TRANSMISSION DEVICE

(71) Applicants: FUJITSU LIMITED, Kawasaki-shi, Kanagawa (JP); FUJITSU TELECOM NETWORKS LIMITED, Kawasaki-shi, Kanagawa (JP)

(72) Inventors: Taketo Endo, Kawasaki (JP); Tomohiro Kaneoka, Kawasaki (JP); Hisayuki Ojima, Kawasaki (JP); Shoichi Murakami, Kanagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/818,697

(22) Filed: Aug. 5, 2015

(65) Prior Publication Data

US 2016/0065305 A1 Mar. 3, 2016

(30) Foreign Application Priority Data

Aug. 29, 2014 (JP) ................................ 2014-175729

(51) Int. Cl.
*H04B 10/00* (2013.01)
*H04B 10/079* (2013.01)
*H04J 14/02* (2006.01)

(52) U.S. Cl.
CPC ..... *H04B 10/07955* (2013.01); *H04J 14/0227* (2013.01)

(58) Field of Classification Search
CPC ...................... H04B 10/07955; H04J 14/0227
See application file for complete search history.

(56) References Cited

U.S. PATENT DOCUMENTS

| 6,160,649 | A  * | 12/2000 | Horiuchi | H04B 10/0775 398/1 |
|---|---|---|---|---|
| 2002/0130256 | A1* | 9/2002 | Macki | H04B 10/077 250/227.21 |
| 2005/0169633 | A1* | 8/2005 | Nakagawa | H04B 10/572 398/85 |
| 2009/0041456 | A1* | 2/2009 | Kachita | H04B 10/07955 398/34 |
| 2013/0251365 | A1* | 9/2013 | Sone | H04B 17/00 398/38 |
| 2016/0065305 | A1* | 3/2016 | Endo | H04J 14/0227 398/34 |

FOREIGN PATENT DOCUMENTS

| JP | 8-293853 | 11/1996 |
|---|---|---|
| JP | 2013-201495 | 10/2013 |

* cited by examiner

*Primary Examiner* — Danny Leung
(74) *Attorney, Agent, or Firm* — Staas & Halsey LLP

(57) ABSTRACT

An optical transmission system includes a transmitting device and a receiving device, wherein the transmitting device includes a modulating unit that changes a frequency of an optical signal, and the receiving device includes a filtering unit that passes an optical signal in a predetermined frequency band; a measuring unit that measures an intensity of an optical signal that passes through the filtering unit; a detecting unit that detects a center wavelength of the optical signal in accordance with an intensity of the optical signal that is measured when a frequency of the optical signal is changed in a state of a passed band that corresponds to the optical signal; and an output unit that outputs information that indicates the detected center wavelength to the transmitting device, wherein the transmitting device controls a wavelength of the optical signal in accordance with the information from the receiving device.

16 Claims, 13 Drawing Sheets

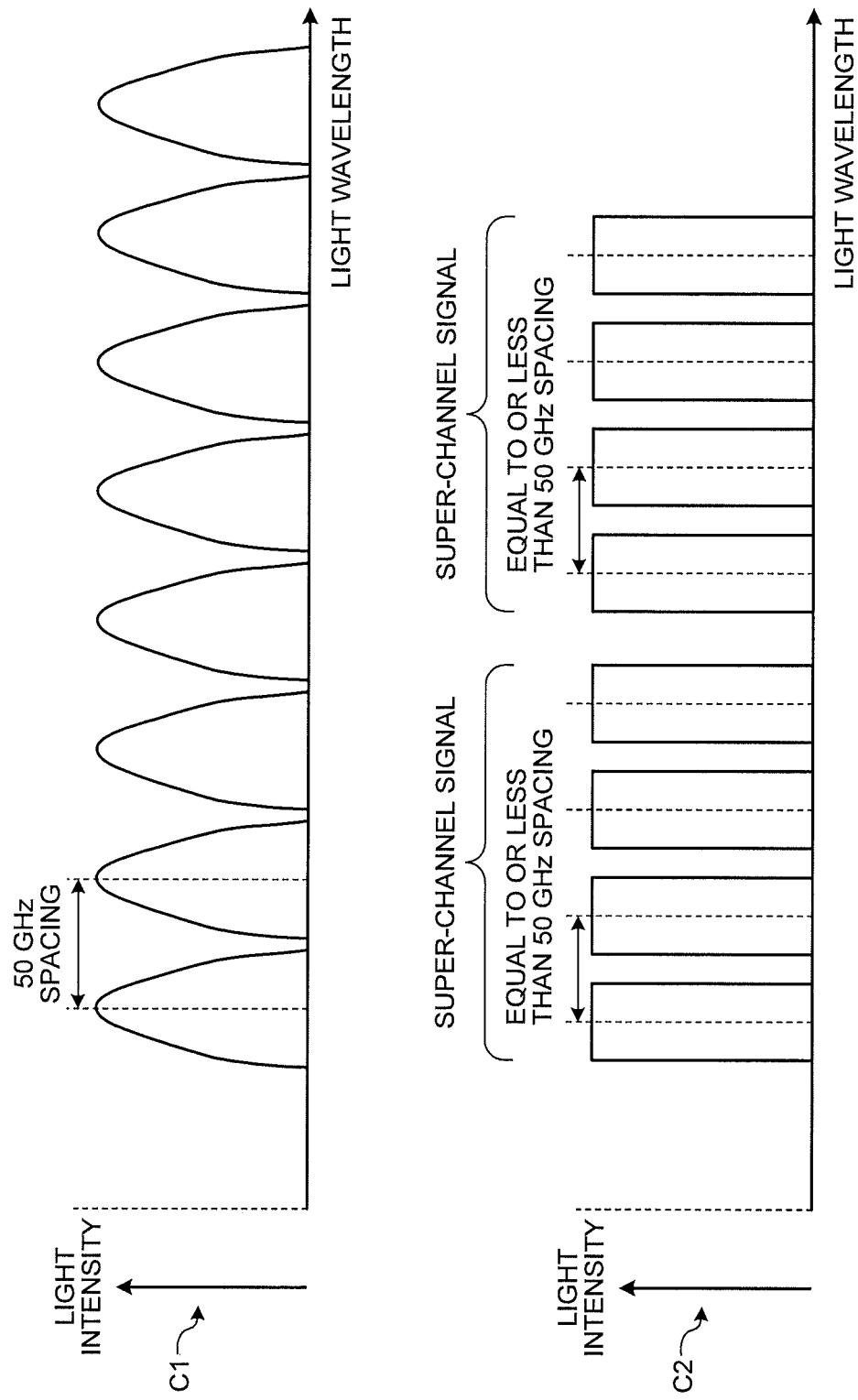

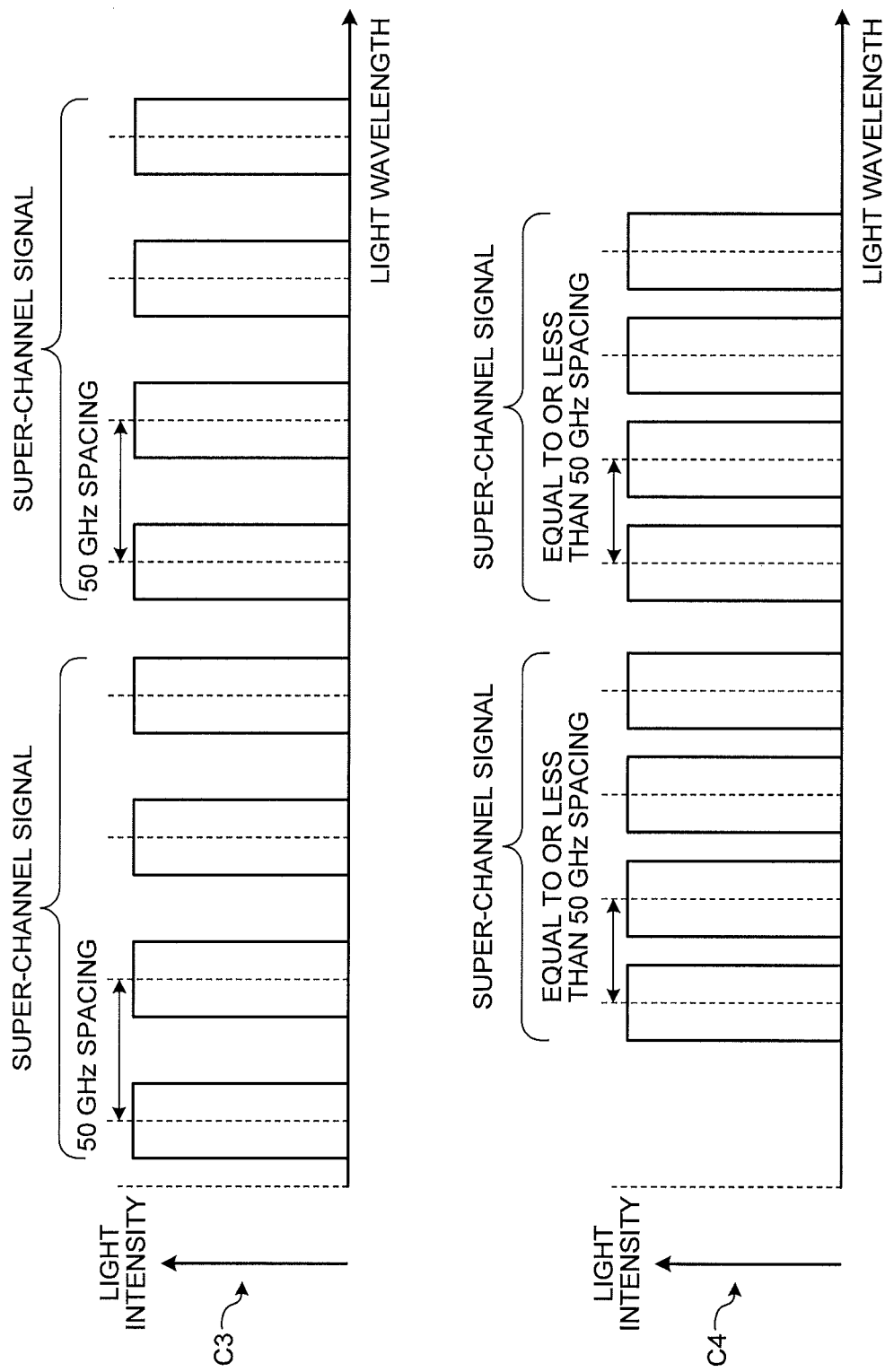

OPTICAL TRANSMISSION SYSTEM AND OPTICAL TRANSMISSION DEVICE

CROSS-REFERENCE TO RELATED APPLICATION

This application is based upon and claims the benefit of priority of the prior Japanese Patent Application No. 2014-175729 filed on Aug. 29, 2014, the entire contents of which are incorporated herein by reference.

FIELD

The embodiment discussed herein is directed to an optical transmission system and an optical transmission device.

BACKGROUND

With regard to optical transmissions, there is demand for further improvement in the communication speed due to an increase in communication traffic. There are known technologies for improving the communication speed, such as Nyquist wavelength division multiplexing (WDM) for improving the frequency usage efficiency of an optical band.

The Nyquist-WDM is implemented by spectrum shaping using digital signal processing. For this spectrum shaping, filtering processing is performed on a wide-band frequency spectrum of a non-return-to-zero (NRZ) optical signal, or the like, so as to reduce the band of the frequency spectrum or shape it. With regard to the filtering processing, there is a well-known filter that makes a time response with a Sinc function form, such as a raised cosine filter and, due to convolution in NRZ optical signals, the band of the frequency spectrum is reduced, and it is shaped into a rectangle.

FIG. 14 is an explanatory diagram that illustrates a comparison between a conventional WDM (case C1) and the Nyquist-WDM (case C2). As illustrated in FIG. 14, in the case C2 of the Nyquist-WDM, optical signals of multiple subcarriers are subjected to wavelength multiplexing in a higher density compared to the case C1 of the conventional WDM. For example, the Nyquist-WDM employs the concept called super-channel in which the optical signals of subcarriers are multiplexed and they are regarded as a single optical signal.

Patent Document 1: Japanese Laid-open Patent Publication No. 2013-201495

Patent Document 2: Japanese Laid-open Patent Publication No. 8-293853

Furthermore, with regard to optical transmissions, if the wavelength interval between adjacent subcarriers is small, the effect of crosstalk between adjacent subcarriers is likely to occur, and the transmission performance is sometimes decreased (performance degradation). Moreover, if the wavelength interval between adjacent subcarriers is small, the performance degradation due to crosstalk sometimes occurs largely due to a wavelength displacement of an optical signal.

FIG. 15 is an explanatory diagram that illustrates a case where the wavelength interval is small in the Nyquist-WDM. As illustrated in FIG. 15, in a case C3 in which the wavelength interval of subcarriers is 50 GHz and a case C4 in which the wavelength interval of subcarriers is equal to or less than 50 GHz, the case C4 is more likely to be affected by a wavelength displacement of the light source. Therefore, there is a need to obtain the center wavelength of the frequency spectrum of an optical signal and adjust a wavelength displacement of the optical signal with high accuracy.

However, in the Nyquist-WDM, the frequency spectrum of an optical signal is shaped into a rectangle; therefore, it is difficult to determine the center wavelength by using the wavelength in which the intensity of the frequency spectrum has some local peaks. Thus, it is not easy to determine the center wavelength of a frequency spectrum with accuracy, and it is difficult to adjust a wavelength displacement of an optical signal with high accuracy.

According to one aspect, it is possible to adjust a wavelength displacement of an optical signal with high accuracy.

SUMMARY

According to an aspect of an embodiment, an optical transmission system includes a transmitting device that transmits optical signals; and a receiving device that receives the optical signals, wherein the transmitting device includes a modulating unit that changes a frequency of the optical signal, and the receiving device includes a filtering unit that passes an optical signal in a predetermined frequency band among the received optical signals; a measuring unit that measures an intensity of an optical signal that passes through the filtering unit; a detecting unit that detects a center wavelength of the optical signal in accordance with an intensity of the optical signal that is measured when a frequency of the optical signal is changed in a state where a band in which the filtering unit passes the optical signal is set to a predetermined frequency band that corresponds to the optical signal; and an output unit that outputs information that indicates the detected center wavelength to the transmitting device, wherein the transmitting device controls a wavelength of the optical signal in accordance with the information that is output from the receiving device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is an explanatory diagram that illustrates a comparison between a conventional WDM and Nyquist-WDM; and FIG. 15 is an explanatory diagram that illustrates a case where the wavelength interval is small in the Nyquist-WDM.

DESCRIPTION OF EMBODIMENTS

Figure 1:
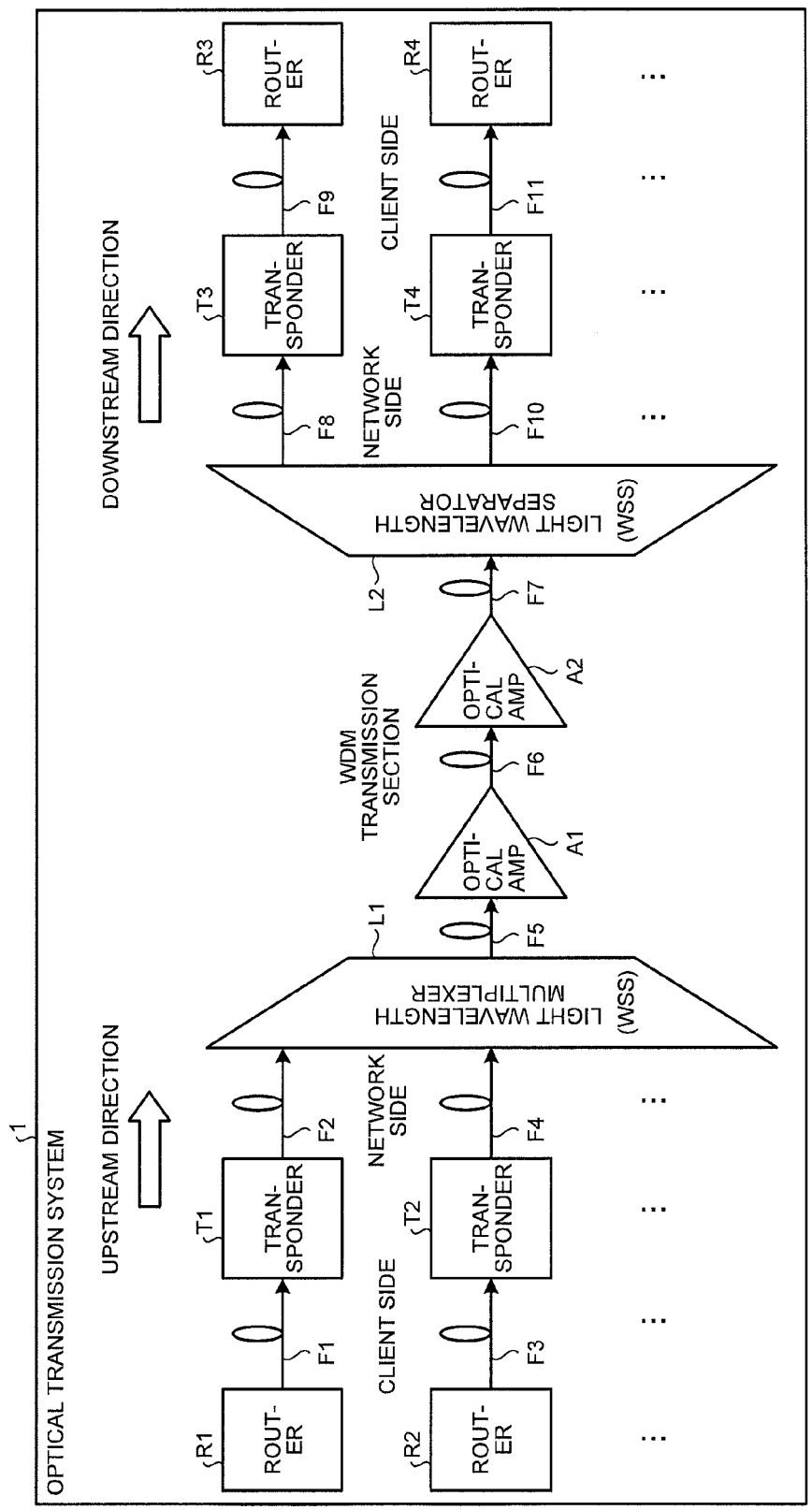
FIG. 1 is a block diagram that illustrates an example of the configuration of an optical transmission system.

Preferred Embodiments of the Present Invention will be explained with reference to accompanying drawings. In the embodiment, the same reference numerals are applied to the components that have the same functionality, and the duplicated explanations are omitted. The optical transmission system and the optical transmission device that are described in the following embodiments are only examples, and this is not a limitation on the embodiments. Each of the following embodiments may be combined as appropriate to the degree that there is no contradiction.

FIG. 1 is a block diagram that illustrates an example of the configuration of an optical transmission system 1. As illustrated in FIG. 1, the optical transmission system 1 includes transponders T1 and T2 so as to transmit an optical signal at each wavelength using light with a narrow optical spectrum by employing the WDM to achieve a higher capacity.

The transponders T1 and T2 perform a light wavelength conversion on an optical signal that is received from routers R1 and R2 at the client side via optical fibers F1 and F3. After the wavelength conversion, the optical signal is subjected to wavelength multiplexing by a light wavelength multiplexer L1 via optical fibers F2 and F4 at the network side. The multiple-wavelength optical signal is amplified by an optical amplifier A1 via an optical fiber F5 and is transmitted by an optical fiber F6 for a long distance. After the level of optical power of the optical signal is attenuated due to the long distance transmission, the optical signal is again amplified by an optical amplifier A2, and then the wavelengths are separated by a light wavelength separator L2 via an optical fiber F7.

The section of the light wavelength multiplexer L1/the light wavelength separator L2 is the WDM transmission section of the network for long distance transmission. A wavelength selective switch (WSS), or the like, is used for the light wavelength multiplexer L1/the light wavelength separator L2. As the WSS is used for the light wavelength multiplexer L1/the light wavelength separator L2, the flexibility for adding/reducing the light wavelengths in the WDM transmission section is improved.

The optical signals of the respective wavelengths, on which wavelength separation has been conducted, are received by transponders T3 and T4 that correspond to the respective wavelengths via optical fibers F8 and F10. The transponders T3 and T4 perform a light wavelength conversion on the optical signals that are received via the optical fibers F8 and F10 at the network side. After the wavelength conversion, the optical signals are transmitted to routers R3 and R4 at the client side via optical fibers F9 and F11.

Figure 2:
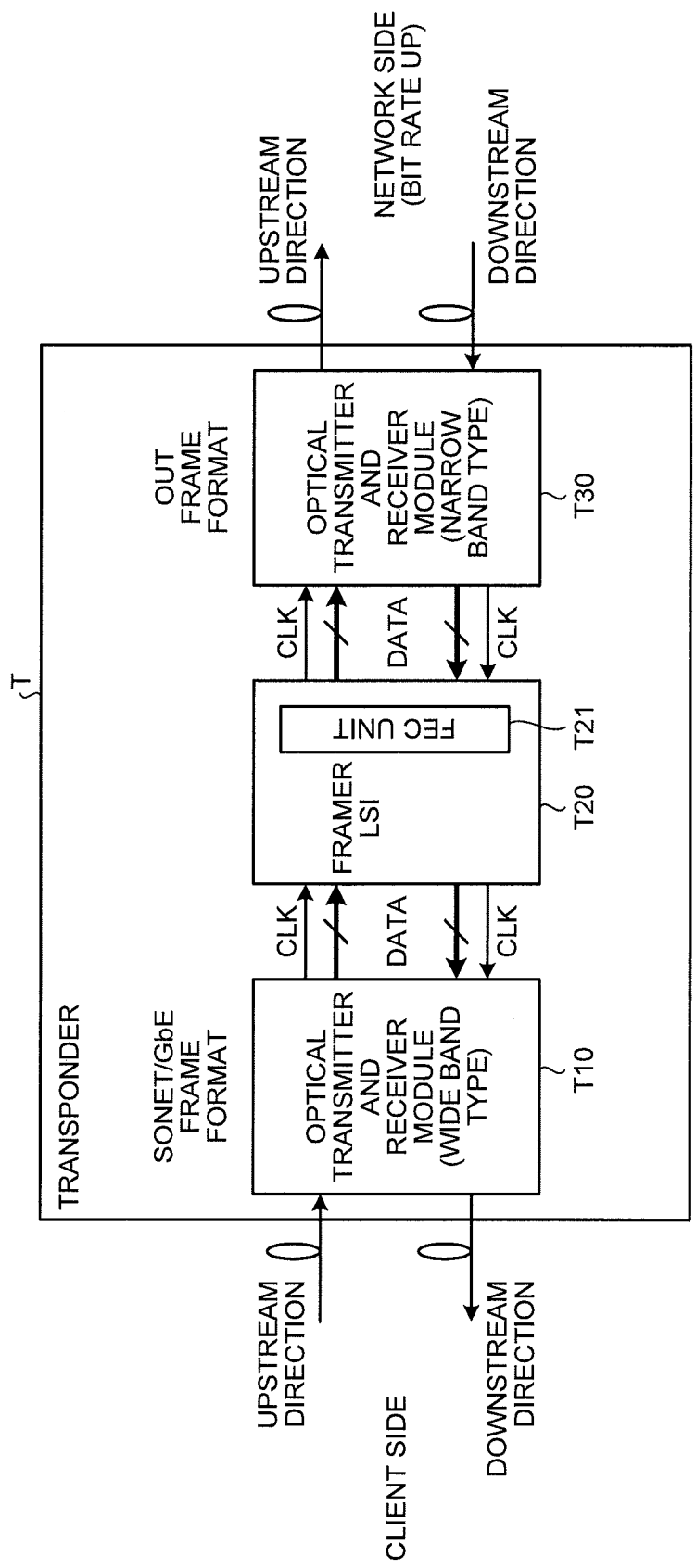
FIG. 2 is a block diagram that illustrates an example of the hardware configuration of a transponder.

FIG. 2 is a block diagram that illustrates an example of the hardware configuration of a transponder T (T1, T2, T3, T4, . . . ). In FIG. 2, the direction of a signal from the client side toward the network side is defined as an upstream direction, and the direction of a signal from the network side toward the client side is defined as a downstream direction.

As illustrated in FIG. 2, the transponder T includes a wide-band type optical transmitter and receiver module T10, a framer large scale integrated (LSI) circuit T20, and a narrow-band type optical transmitter and receiver module T30. These components are connected such that they can input/output signals or data in one or both of the upstream direction and the downstream direction.

For example, the wide-band type optical transmitter and receiver module T10 receives an optical signal with the usual optical spectrum (wide band) from the router R1 at the client side and converts the received optical signal into an electric signal. The framer LSI T20 performs frame processing, such as Synchronous Optical Network (SONET)/Gigabit Ethernet (GbE (registered trademark)), on the electric signal that is input from the optical transmitter and receiver module T10. The framer LSI T20 includes a Forward Error Correction (FEC) unit T21. The FEC unit T21 adds an error-correcting code to an electric signal that is to be transmitted to the network side, thereby preventing errors caused by waveform degradation due to a long distance transmission or degradation of the optical signal noise ratio (OSNR) in the optical amplifiers A1 and A2. Furthermore, the FEC unit T21 performs an error correction by using an error-correcting code included in the electric signal that is received from the network side. For example, the narrow-band type optical transmitter and receiver module T30 converts the electric signal input from the framer LSI T20 into an optical signal again.

The narrow-band type optical transmitter and receiver module T30 uses a digital coherent module, such as an analog-to-digital converter/digital signal processor (ADC/DSP), at the light receiving side so as to handle with the high speed of 100 Gbps. The digital coherent module can change the reception characteristics by changing parameters for digital processing.

Figure 3:
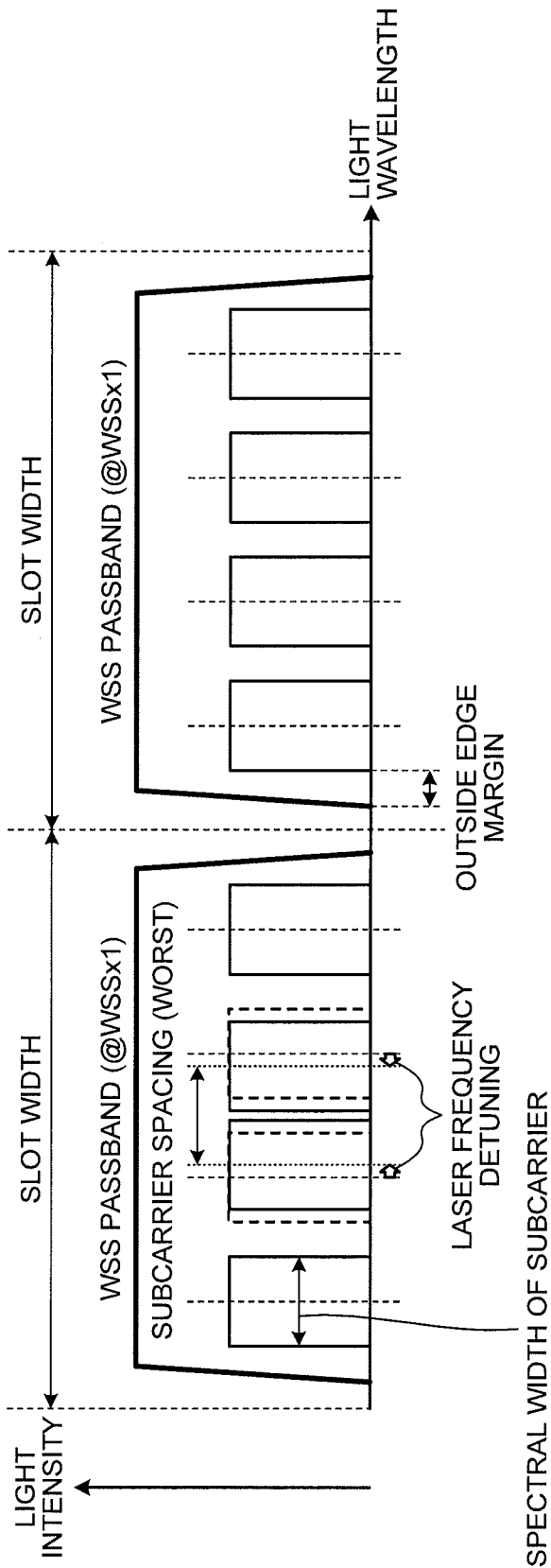
FIG. 3 is an explanatory diagram that illustrates multi-wavelength subcarriers.

FIG. 3 is an explanatory diagram that illustrates multi-wavelength subcarriers. As illustrated in FIG. 3, the optical transmitter and receiver module T30 transmits and receives an optical signal by using the subcarrier configuration using the WSS, thereby achieving further improvement in the transmission speed.

Figure 4:
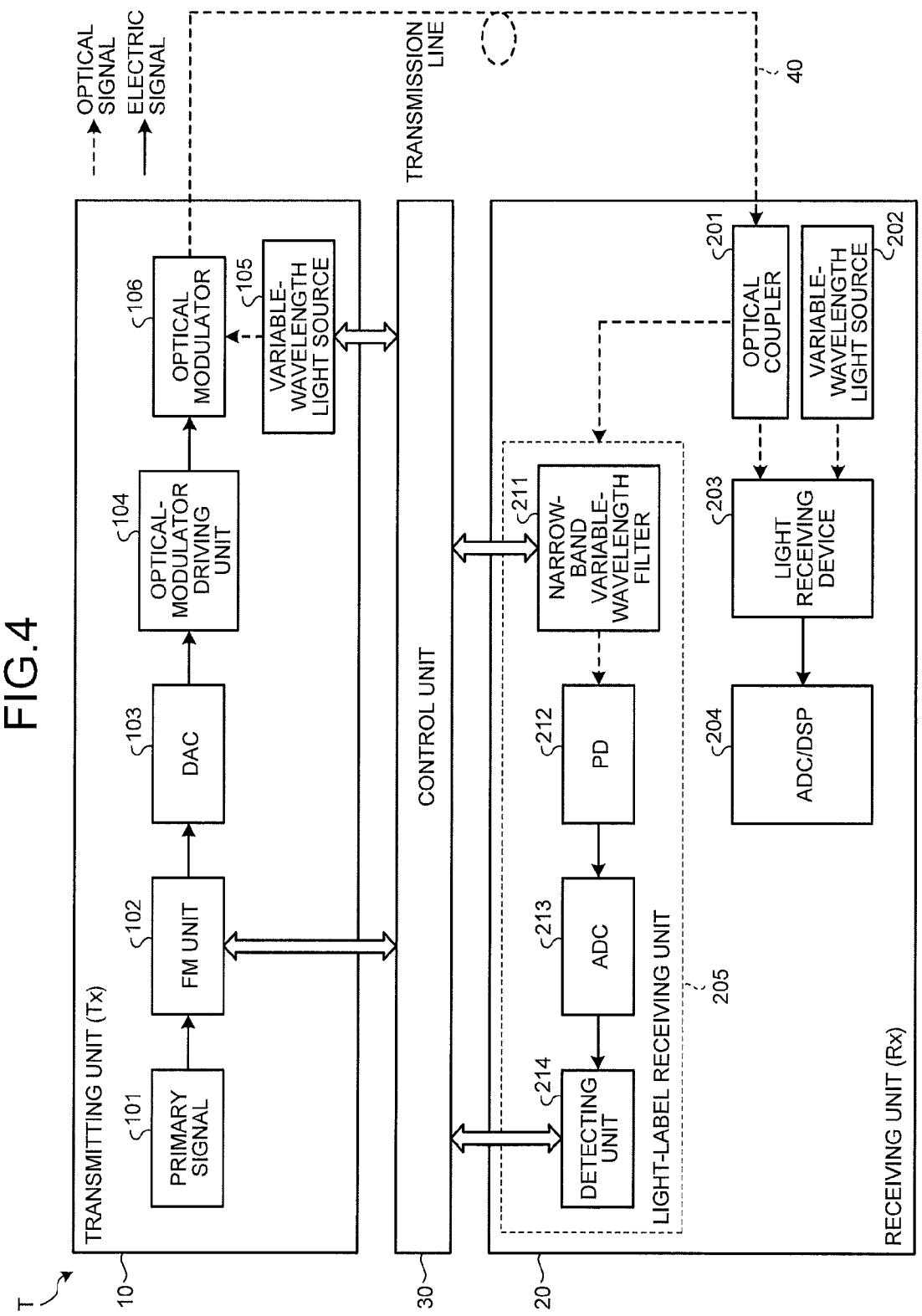
FIG. 4 is a block diagram that illustrates an example of the functional configuration of the transponder.

FIG. 4 is a block diagram that illustrates an example of the functional configuration of the transponder T. As illustrated in FIG. 4, the transponder T includes a transmitting unit 10 (sometimes also referred to as Tx), a receiving unit 20 (sometimes also referred to as Rx), and a control unit 30 as the functional configurations that are implemented by the above-described optical transmitter and receiver modules T10 and T30, the framer LSI T20, or the like. Transactions of information among the transmitting unit 10, the receiving unit 20, and the control unit 30 are conducted by using the User Datagram Protocol (UDP), or the like.

The transmitting unit 10 includes a frequency modulation (FM) unit 102, a digital-to-analog converter (DAC) 103, an optical-modulator driving unit 104, an optical modulator 106, and a variable-wavelength light source 105. The FM unit 102 performs frequency modulation (FM) to change the frequency of a primary signal 101 under the control of the control unit 30 and outputs it to the DAC 103. Specifically, if the FM is turned on by the control unit 30, the FM unit 102 changes the frequency of the primary signal 101 and outputs it to the DAC 103. Furthermore, if the FM is turned off by the control unit 30, the FM unit 102 outputs the primary signal 101 to the DAC 103 without changing the frequency.

If the FM is on, a wavelength shift, which is a wavelength displacement from the wavelength in a case where the FM is not performed, occurs in the optical signal that is output to a transmission line 40 by the transmitting unit 10. Therefore, the transponder T on the receiving side via the transmission line 40 detects the presence or absence of a wavelength shift so as to receive the information that is transmitted by the transponder T on the transmitting side by turning on/off the FM. For example, the transponder T turns on/off the FM to transmit monitoring information (light label) to the transponder T on the receiving side via the transmission line 40.

The DAC 103 converts the primary signal 101, which is output via the FM unit 102, into an analog electric signal and outputs it to the optical-modulator driving unit 104. The optical-modulator driving unit 104 amplifies the electric signal from the DAC 103 to generate the drive signal for driving the optical modulator 106. The drive signal generated by the optical-modulator driving unit 104 is output to the optical modulator 106.

The variable-wavelength light source 105 is a light source that varies the wavelength of light that is generated under the control of the control unit 30. Under the control of the control unit 30, the variable-wavelength light source 105 generates light with various wavelengths. Specifically, under the control of the control unit 30, the variable-wavelength light source 105 generates light with a predetermined wavelength so as to prevent crosstalk in a case of the transmission of a multiple-wavelength optical signal. Light that is generated by the variable-wavelength light source 105 is output to the optical modulator 106.

The optical modulator 106 modulates the light that is generated by the variable-wavelength light source 105 on the basis of the drive signal that is generated by the optical-modulator driving unit 104, thereby generating the optical signal that corresponds to the primary signal 101. The optical signal that is generated by the optical modulator 106 is transmitted to the different transponder T via the transmission line 40.

The receiving unit 20 includes an optical coupler 201, a variable-wavelength light source 202, a light receiving device 203, an ADC/DSP 204, and a light-label receiving unit 205. The optical coupler 201 bifurcates into a path for coherent reception of an optical signal from the transmission line 40 by using the variable-wavelength light source 202, the light receiving device 203, and the ADC/DSP 204 and into a path for light label reception by detecting a wavelength shift of an optical signal by using the light-label receiving unit 205. As described above, an optical signal is bifurcated by the optical coupler 201, and light label reception is conducted by using the different path from that for coherent reception; thus, it is possible to detect a wavelength shift regardless of whether the primary signal is communicated. In the path of the variable-wavelength light source 202, the light receiving device 203, and the ADC/DSP 204, the primary signal is received by using the optical signal that is input from the optical coupler 201. The light-label receiving unit 205 detects a wavelength shift of an optical signal by the FM unit 102.

The light-label receiving unit 205 includes a narrow-band variable-wavelength filter 211, a photodetector (PD) 212, an ADC 213, and a detecting unit 214. The narrow-band variable-wavelength filter 211 passes the optical signal in a predetermined frequency band among the optical signals that are bifurcated by the optical coupler 201. Specifically, the narrow-band variable-wavelength filter 211 passes the optical signal that corresponds to the filter band that is set under the control of the control unit 30. The set filter band is, for example, the band that corresponds to the edge of an optical signal spectrum. By setting the filter band as described above, the intensity of an optical signal that passes through the narrow-band variable-wavelength filter 211 is changed in accordance with a wavelength shift of the optical signal by the FM unit 102. Thus, a wavelength shift of an optical signal can be detected on the basis of the intensity of the optical signal that is measured by the PD 212 at the subsequent step.

The PD 212 receives (measures) the optical signal that passes through the narrow-band variable-wavelength filter 211 and outputs the analog signal that corresponds to the intensity of the optical signal to the ADC 213. The ADC 213 converts the analog signal from the PD 212 into a digital signal and outputs it to the detecting unit 214.

The detecting unit 214 is, for example, a detecting device that detects a wavelength shift (FM) of an optical signal by digital signal processing of a Field Programmable Gate Array (FPGA), or the like. The detecting unit 214 notifies the control unit 30 of a detection result.

The control unit 30 controls various operations of the transponder T. Specifically, the control unit 30 performs an on/off control on the FM by the FM unit 102, a wavelength control on the variable-wavelength light source 105, a filter control on the narrow-band variable-wavelength filter 211, or the like. Furthermore, in accordance with a detection result of the detecting unit 214, the control unit 30 detects the presence or absence of a wavelength shift of an optical signal or the center wavelength of an optical signal (detects a displacement direction to a long wavelength side or a short wavelength side with respect to a predetermined wavelength and the degree of shift). Furthermore, the control unit 30 performs an on/off control on the FM by the FM unit 102, or the like, so as to output the wavelength shift information about the detected center wavelength of the optical signal to the transmitting side. Moreover, the control unit 30 controls the wavelength of the variable-wavelength light source 105 on the basis of the wavelength shift information that is output from the receiving side.

Figure 5:
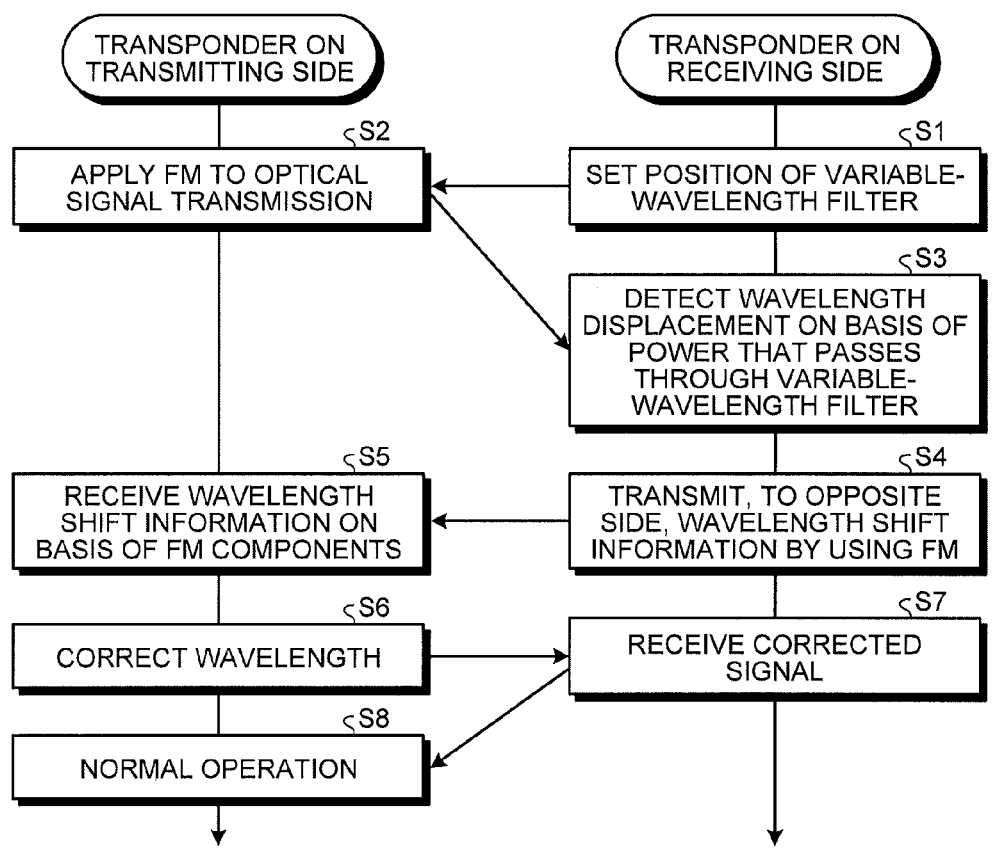
FIG. 5 is a flowchart that illustrates an example of the operation of the optical transmission system.

Here, an explanation is given of the operation performed by the transponders T on the receiving side and on the transmitting side in the optical transmission system 1 under the control of the control unit 30. FIG. 5 is a flowchart that illustrates an example of the operation of the optical transmission system 1. The operations (Step S1 to Step S8) illustrated in FIG. 5 are related to a single channel or subcarrier of an optical signal; however, the operations of Step S1 to Step S8 may be repeatedly performed for each of multiple channels or subcarriers.

As illustrated in FIG. 5, the transponder T on the receiving side sets the position (filter band) of the narrow-band variable-wavelength filter 211 under the control of the control unit 30 (Step S1). Specifically, the control unit 30 includes a database that corresponds to each wavelength of a channel or subcarrier of an optical signal, and it sweeps the filter band of the narrow-band variable-wavelength filter 211 by using the wavelength recorded in the database as a reference. Next, the control unit 30 plots the intensity of an optical signal, which is measured by the PD 212, with regard to the sweep wavelength of the filter band, thereby detecting the edge of the spectrum of the optical signal. Then, the control unit 30 sets the detected edge position as the center wavelength of the filter band. The filter band is set for each channel or subcarrier of an optical signal by using, as a reference, the wavelength that is recorded in the database.

Figure 6:
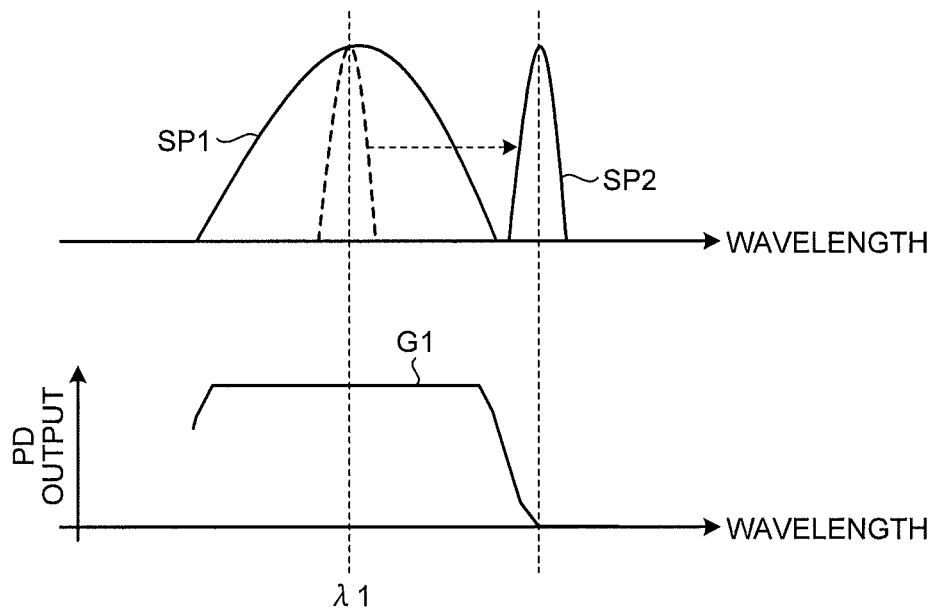
FIG. 6 is an explanatory diagram that explains the filter setting.

FIG. 6 is an explanatory diagram that explains the filter setting. In FIG. 6, a primary signal spectrum SP1 is the spectrum of an optical signal with a reference wavelength 21 as a center. A filter spectrum SP2 is the spectrum that indicates the filter band of the narrow-band variable-wavelength filter 211. Furthermore, an output graph G1 represents the output of the PD 212 in a case where the filter spectrum SP2 is swept. As illustrated in FIG. 6, the control unit 30 uses the output graph G1 in a case of sweeping of the filter band to set the narrow-band variable-wavelength filter 211 such that the filter spectrum SP2 is located in the edge position of the primary signal spectrum SP1. After the filter band is set, the transponder T on the receiving side uses the light label (the FM of the FM unit 102) to notify the transponder T on the transmitting side that the filter band has been set under the control of the control unit 30. The filter band may be set not only at the edge position on a long wavelength side as illustrated but also at the edge position on a short wavelength side.

After receiving a notification that the filter band has been set under the control of the control unit 30, the transponder T on the transmitting side turns on FM of the FM unit 102 and applies FM to the optical signal transmission (Step S2).

In the transponder T on the receiving side, the detecting unit 214 detects a wavelength displacement (wavelength shift) on the basis of the power (intensity) of the optical signal that passes through the narrow-band variable-wavelength filter 211 (Step S3). The control unit 30 obtains the wavelength shift information about the center wavelength of the optical signal in accordance with a detection result of the detecting unit 214.

Figure 7:
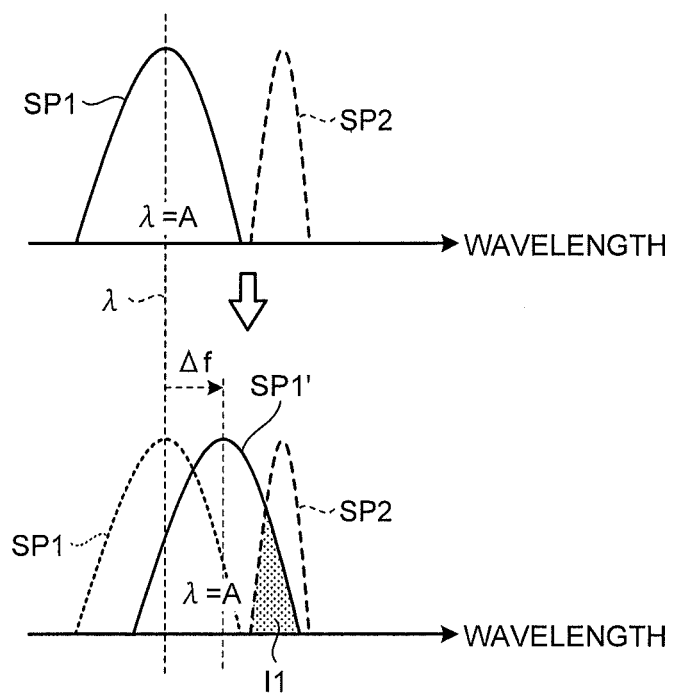
FIG. 7 is an explanatory diagram that illustrates detection of wavelength shift information.

FIG. 7 is an explanatory diagram that illustrates detection of the wavelength shift information. As illustrated in FIG. 7, if the transponder T on the transmitting side superposes the frequency modulation to the primary signal 101, the primary signal spectrum SP1 and the filter spectrum SP2 of the narrow-band variable-wavelength filter 211 are superposed in accordance with the degree of modulation. Specifically, a superposed area is generated between the filter spectrum SP2 and a primary signal spectrum SP1' that is modulated by $\Delta f$ to the long wavelength side. The PD 212 obtains superposition information I1 that corresponds to the superposed area.

As the center wavelength of the filter spectrum SP2 is located in the edge position of the primary signal spectrum SP1', the superposition information I1 changes responsively in accordance with the degree of modulation. Furthermore, as the superposition information I1 is uniquely determined in accordance with the modulation method/the filter shape of the narrow-band variable-wavelength filter 211, the information indicates a shift of the center wavelength of the primary signal spectrum SP1. For example, if the optical signal on the transmitting side has a wavelength shift, a difference occurs in the superposition information I1. Therefore, if the superposition information I1 is compared with a predetermined threshold, the direction (the long wavelength side or the short wavelength side) of the wavelength shift of an optical signal can be determined in accordance with the volume of the superposition information I1 with respect to the predetermined threshold. Furthermore, by using the difference between the predetermined threshold and the superposition information I1, it is possible to determine the degree of shift that indicates how much the center wavelength of the optical signal shifts from the predetermined center wavelength. Moreover, on the basis of the degree of shift, it is possible to determine a displacement of the center wavelength of the optical signal with respect to the predetermined wavelength with high accuracy.

Figure 8:
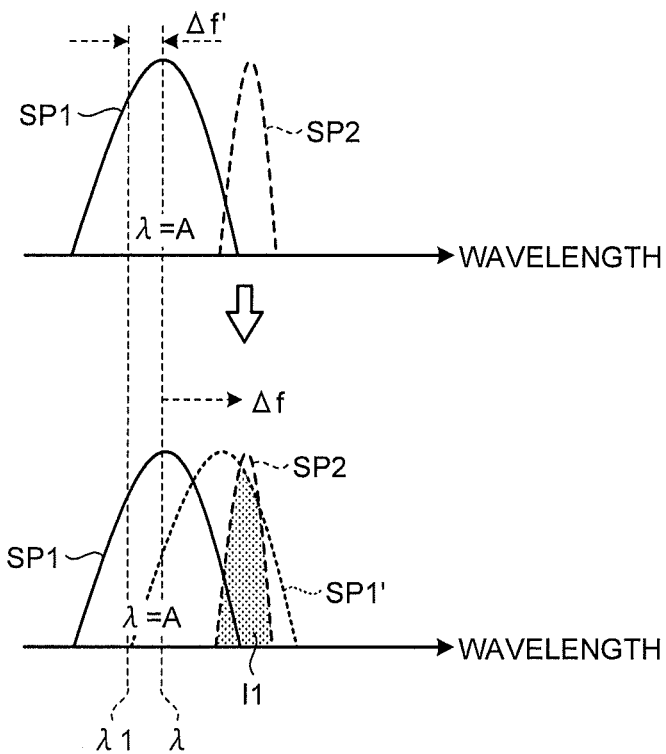
FIG. 8 is an explanatory diagram that illustrates a case where the wavelength of a light source is shifted to a long wavelength side.

FIG. 8 is an explanatory diagram that illustrates a case where the wavelength of the light source is shifted to the long wavelength side. As illustrated in FIG. 8, it is assumed that a center wavelength $\lambda$ ($\lambda$=A) of the optical signal is shifted by $\Delta f'$ to the long wavelength side with respect to a reference wavelength $\lambda 1$ that serves as a reference. As described above, if the center wavelength $\lambda$ of the optical signal is shifted to the long wavelength side, the primary signal spectrum SP1' due to the FM and the filter spectrum SP2 of the narrow-band variable-wavelength filter 211 are superposed in a large size.

Figure 9:
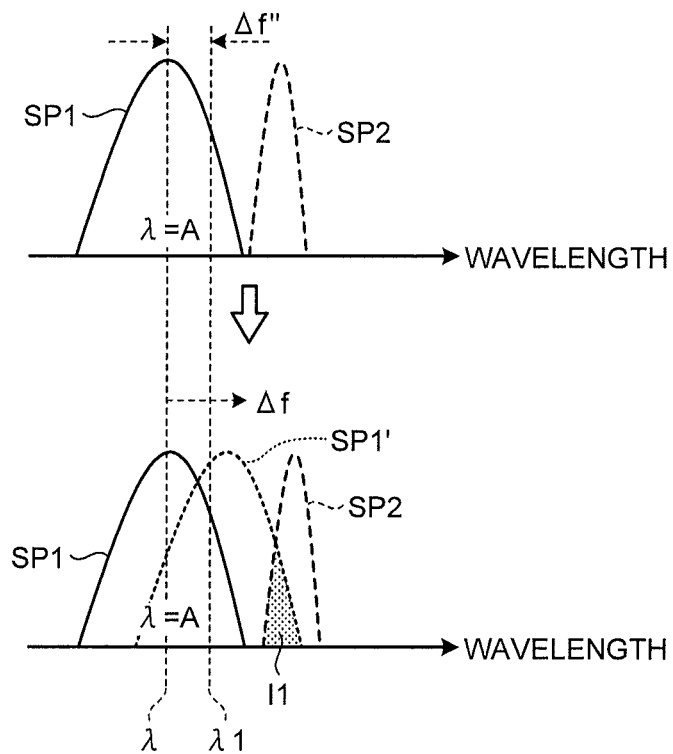
FIG. 9 is an explanatory diagram that illustrates a case where the wavelength of the light source is shifted to a short wavelength side.

FIG. 9 is an explanatory diagram that illustrates a case where the wavelength of the light source is shifted to the short wavelength side. As illustrated in FIG. 9, it is assumed that the center wavelength $\lambda$ ($\lambda$=A) of the optical signal is shifted by $\Delta f''$ to the short wavelength side with respect to the reference wavelength $\lambda 1$ that serves as a reference. As described above, if the center wavelength $\lambda$ of the optical signal is shifted to the short wavelength side, the primary signal spectrum SP1' due to the FM and the filter spectrum SP2 of the narrow-band variable-wavelength filter 211 are superposed in a small size.

Next, in the transponder T on the receiving side, the control unit 30 transmits, to the opposite side (the transmitting side), the wavelength shift information on the shift direction, the degree of shift, or the like, of the center wavelength with respect to a predetermined wavelength by using the FM of the FM unit 102 (Step S4). In the transponder T on the transmitting side, the control unit 30 receives the wavelength shift information, which is transmitted from the receiving side, on the basis of the FM components that are detected by the light-label receiving unit 205 (Step S5).

Next, in the transponder T on the transmitting side, the control unit 30 corrects the wavelength of the variable-wavelength light source 105 on the basis of the received wavelength shift information (Step S6). Specifically, on the basis of the shift direction and the degree of shift of the center wavelength that is included in the wavelength shift information, the control unit 30 adjusts the wavelength of light that is generated by the variable-wavelength light source 105 such that the center wavelength of the optical signal becomes a predetermined reference wavelength.

Next, the transponder T on the receiving side receives the optical signal for which the wavelength has been corrected (Step S7). Here, in the transponder T on the receiving side, the control unit 30 acquires the wavelength shift information on the optical signal, for which the wavelength has been corrected, and checks a displacement of the center wavelength of the optical signal with respect to the predetermined reference wavelength. If a displacement of the center wavelength is sufficiently small and it falls within a predetermined threshold, the control unit 30 notifies the opposite side (the transmitting side) that the FM on the transmitting side is to be canceled by using the FM of the FM unit 102. Thus, under the control of the control unit 30, the transponder T on the transmitting side cancels the FM of the FM unit 102 so as to perform the normal operation (Step S8).

Furthermore, if a displacement of the center wavelength is large and it is larger than the predetermined threshold, the control unit 30 returns to Step S1 and repeats the operation.

As described above, the transponder T on the transmitting side includes the FM unit 102 that changes the frequency of an optical signal to be transmitted under the control of the control unit 30. Furthermore, the transponder T on the receiving side includes the narrow-band variable-wavelength filter 211 that passes an optical signal in a predetermined frequency band among the received optical signals and includes the PD 212 that measures the intensity of an optical signal that passes through the narrow-band variable-wavelength filter 211. Furthermore, in the transponder T on the receiving side, the control unit 30 detects the center wavelength of an optical signal on the basis of the intensity of the optical signal that is measured when the frequency of the optical signal is changed in a state where the band in which the narrow-band variable-wavelength filter 211 passes the optical signal is set to a predetermined frequency band that corresponds to the optical signal. Moreover, in the transponder T on the receiving side, the control unit 30 outputs the wavelength shift information that indicates the detected center wavelength to the transponder T on the transmitting side. Then, the transponder T on the transmitting side controls the wavelength of the variable-wavelength light source 105 on the basis of the wavelength shift information that is output from the transponder T on the receiving side.

Thus, the optical transmission system 1 makes it possible to adjust a wavelength displacement of an optical signal with high accuracy. For example, the band in which the narrow-band variable-wavelength filter 211 passes an optical signal is set to the edge position of the spectrum of the optical signal; therefore, even if the spectrum of the optical signal is shaped into a rectangle, a change in the intensity of the optical signal due to a wavelength shift can be detected accurately. Thus, a displacement of the center wavelength of the optical signal with respect to a predetermined wavelength can be determined with high accuracy, and a wavelength displacement of the optical signal can be adjusted with high accuracy.

The operations of Step S1 to Step S8 are repeatedly performed on each of the channels or subcarriers so that the control unit 30 in the transponder T on the transmitting side changes the frequency of an optical signal to be transmitted by using the different frequency for each channel. Furthermore, in the transponder T on the receiving side, the control unit 30 detects the center wavelength of each channel of the optical signal on the basis of the measured intensity of each channel of the optical signal in a state where the band in which the narrow-band variable-wavelength filter 211 passes the optical signal is set with respect to each channel of the optical signal. Moreover, in the transponder T on the receiving side, the control unit 30 outputs the wavelength shift information that is detected for each channel to the transponder T on the transmitting side. Then, the transponder T on the transmitting side controls the wavelength of the variable-wavelength light source 105 for each channel on the basis of the wavelength shift information that is output from the transponder T on the receiving side for each channel. Thus, a wavelength displacement of the optical signal in each channel or subcarrier can be adjusted with high accuracy, and crosstalk between channels or subcarriers can be prevented.

Figure 10:
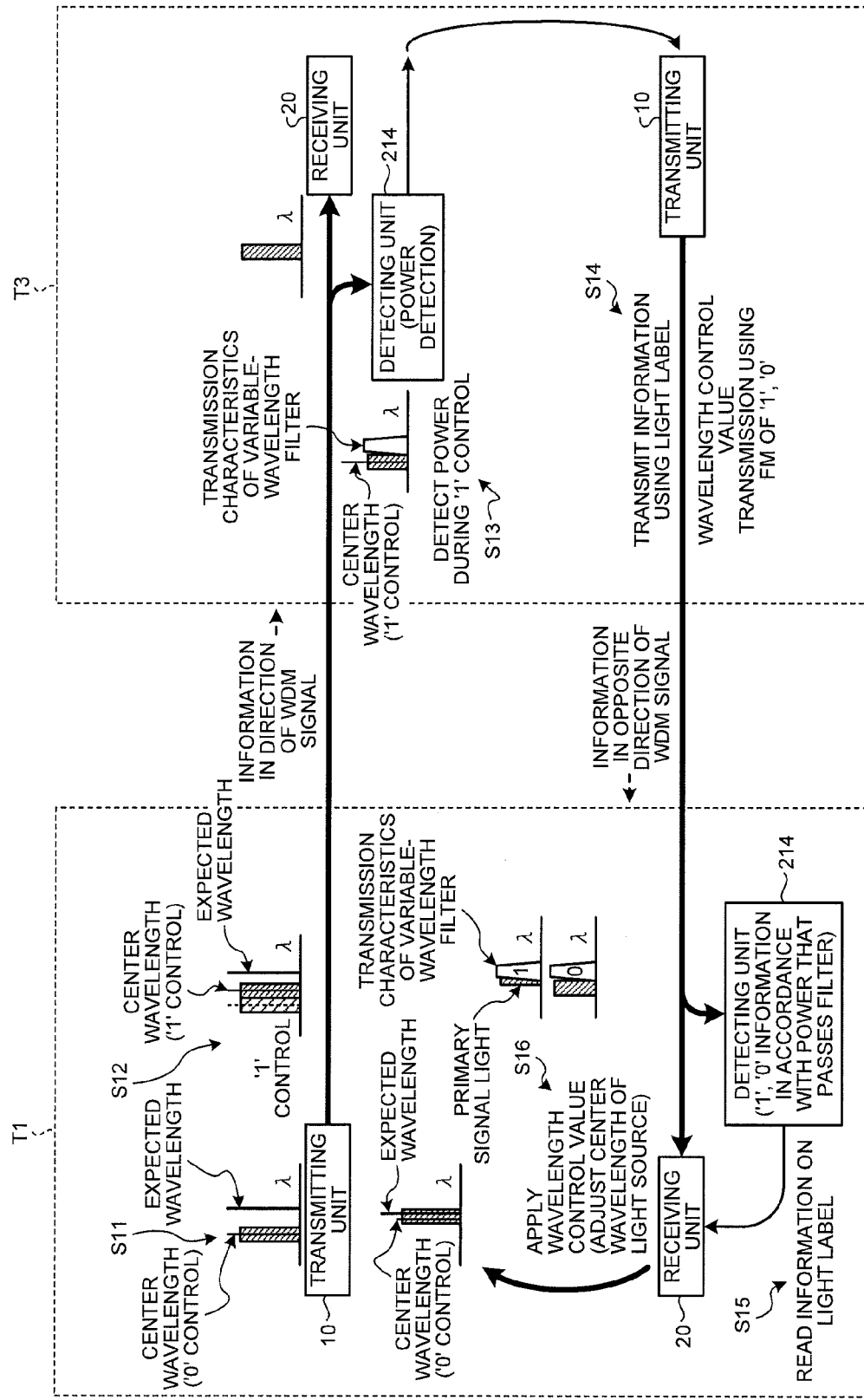
FIG. 10 is an explanatory diagram that illustrates a case where the wavelength shift information is transmitted with FM.

Here, an explanation is given of a specific example of a case where the transponder T on the receiving side transmits the wavelength shift information by using FM and the transponder T on the transmitting side adjusts the center wavelength of the optical signal on the basis of the wavelength shift information. FIG. 10 is an explanatory diagram that illustrates a case where the wavelength shift information is transmitted with FM. In the illustrated example, the transponder T1 is on the transmitting side, and the transponder T3 is on the receiving side.

In the initial state (Step S11), the transmitting unit 10 of the transponder T1 sets the wavelength of the variable-wavelength light source 105 to a predetermined wavelength (center wavelength) that is needed for the WDM line. Ideally, the above center wavelength is equivalent to an expected wavelength; however, a displacement sometimes occurs due to variations in the characteristics of the variable-wavelength light source 105, or the like. In this example, it is assumed that the center wavelength is shifted to the short wavelength side with respect to the expected wavelength that is expected for the transmission of the WDM line. Here, a case where the FM is not applied to an optical signal by the transmitting unit 10 is referred to as the '0' control, and a case where the FM is applied as the '1' control.

Next, the transmitting unit 10 of the transponder T1 applies FM to the optical signal, thereby setting the '1' control (Step S12). As the '1' control is set, the center wavelength of the optical signal is shifted to the long wavelength side. As the FM is a digital control, the control value and the degree of movement of the center wavelength are logically defined.

Next, the detecting unit 214 of the transponder T3 detects the intensity of the optical signal during the '1' control (Step S13). If the center wavelength of the optical signal is shifted to the long wavelength side, the intensity of the optical signal that passes through the narrow-band variable-wavelength filter 211 becomes higher. By using the high-accuracy narrow-band variable-wavelength filter 211, the intensity of an optical signal that has passed through the narrow-band variable-wavelength filter 211 is measured, whereby the wavelength shift information can be detected.

Next, the transmitting unit 10 of the transponder T3 transmits the detected wavelength shift information to the transponder T1 by information transmission using a light label (Step S14). Specifically, the wavelength shift information is transmitted to the transponder T1 by using the digital information on the '0' and '1' controls.

Next, the control unit 30 of the transponder T1 reads the information on the light label on the basis of the detection result of the detecting unit 214 (Step S15). Specifically, the detecting unit 214 sets the filter band to a predetermined band and measures the intensities of the optical signals that correspond to the '0' and '1' controls of the transponder T3. The control unit 30 reads the intensities of the optical signals that correspond to the '0' and '1' controls of the transponder T3 as the digital information on '0' and '1'. Thus, the control unit 30 of the transponder T1 obtains the wavelength shift information that is transmitted from the transponder T1.

Next, the control unit 30 of the transponder T1 uses the wavelength shift information, which is transmitted from the transponder T3, to apply the wavelength control value of the variable-wavelength light source 105 such that the wavelength of the variable-wavelength light source 105 becomes close to the expected wavelength (Step S16).

Figure 11:
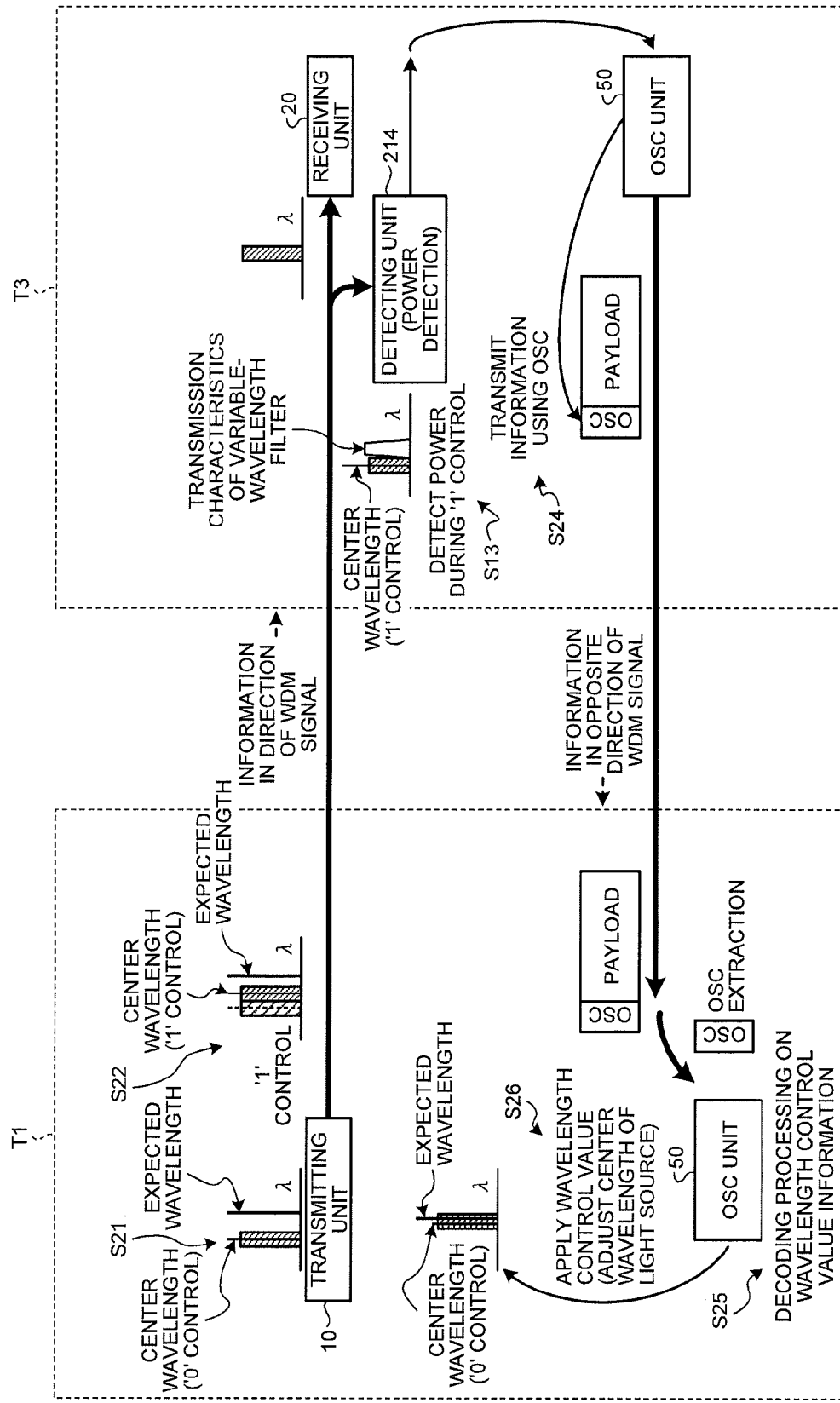
FIG. 11 is an explanatory diagram that illustrates a case where the wavelength shift information is transmitted by using OSC signals.

The wavelength shift information may be transmitted between the transponders T such that it is included in Optical Service Channel (OSC) signals as well as the above-described FM. FIG. 11 is an explanatory diagram that illustrates a case where the wavelength shift information is transmitted by using OSC signals. In the illustrated example, the transponder T1 is on the transmitting side, and the transponder T3 is on the receiving side. Furthermore, the transponders T1 and T3 include an OSC unit 50 that transmits and receives OSC signals.

As illustrated in FIG. 11, the operations at Step S21 to Step S23 are the same as those at Step S11 to Step S13 that are explained with reference to FIG. 10.

Next to Step S23, the OSC unit 50 of the transponder T3 transmits the detected wavelength shift information to the transponder T1 as information transmission using OSC signals (Step S24). Specifically, the OSC unit 50 performs an encoding operation to include the wavelength shift information in OSC signals and transmits it to the transponder T1. Next, the OSC unit 50 of the transponder T1 extracts the OSC signals and performs a decoding operation on the extracted OSC signals to acquire the wavelength shift information (Step S25).

Next, the control unit 30 of the transponder T1 uses the wavelength shift information, which is transmitted from the transponder T3, to apply the wavelength control value of the variable-wavelength light source 105 such that the wavelength of the variable-wavelength light source 105 becomes close to the expected wavelength (Step S26).

MODIFIED EXAMPLE

With regard to the filter band that is set in the narrow-band variable-wavelength filter 211, an error sometimes occurs in the passband width or the wavelength setting accuracy due to the individual variability of the narrow-band variable-wavelength filter 211. A modified example illustrates an optical transmission system where optical signals are transmitted by the single transmitting unit 10 (e.g., Tx1) and are received by the multiple receiving units 20 (Rx1, Rx2, . . . ) and the settings on the transmitting unit 10 are made on the basis of the average of the wavelength shift information from the receiving units 20.

Figure 12:
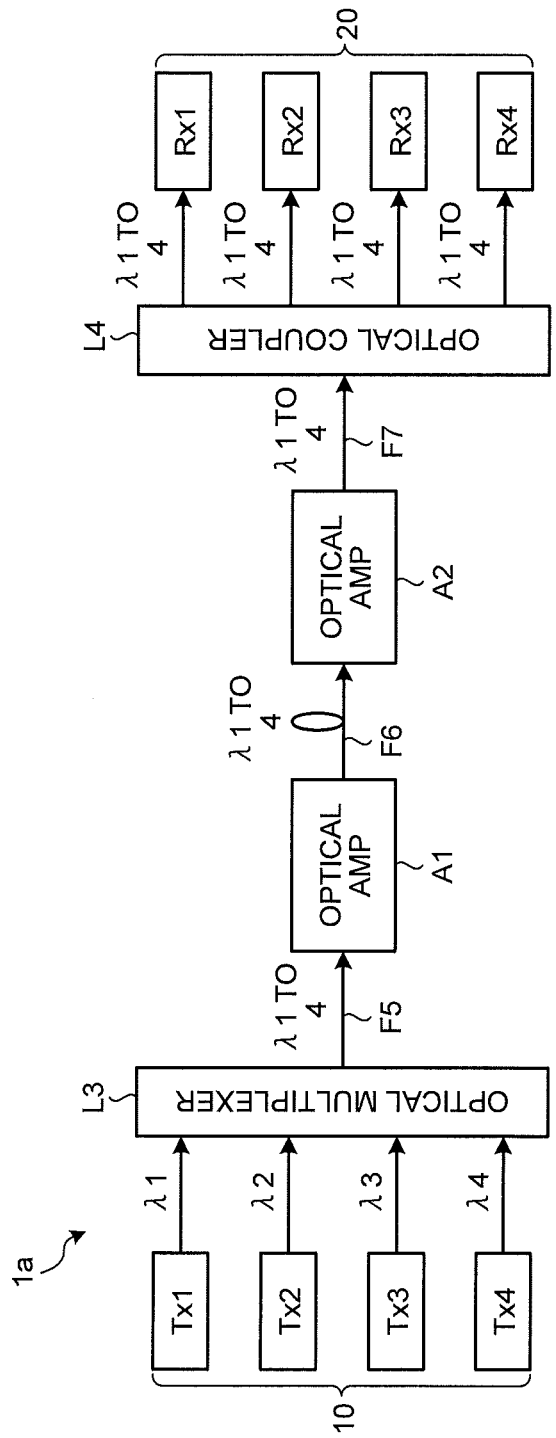
FIG. 12 is a block diagram that illustrates an example of the configuration of an optical transmission system according to a modified example.

FIG. 12 is a block diagram that illustrates an example of the configuration of an optical transmission system 1a according to the modified example. As illustrated in FIG. 12, in the optical transmission system 1a, optical signals (λ1, λ2, λ3, and λ4) from the multiple transmitting units 10 (Tx1, Tx2, Tx3, and Tx4) are multiplexed and transmitted by an optical multiplexer L3. Then, the multiplexed optical signals (λ1, λ2, λ3, and λ4) are received by the multiple receiving units 20 (Rx1, Rx2, Rx3, and Rx4) due to bifurcation of an optical coupler L4. Thus, the receiving units 20 (Rx1, Rx2, Rx3, and Rx4) are capable of receiving the optical signal (λ1) of the single transmitting unit 10 (Tx1).

Figure 13:
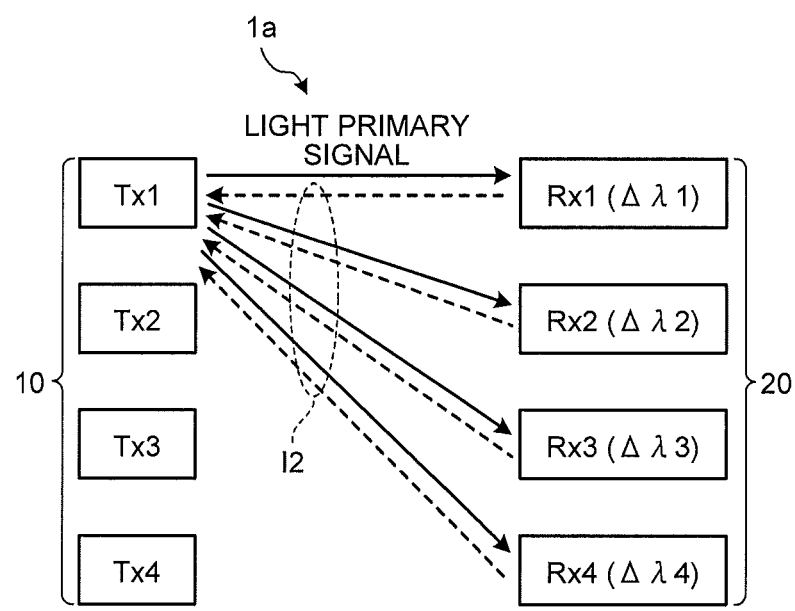
FIG. 13 is an explanatory diagram that illustrates averaging by the optical transmission system according to the modified example.

FIG. 13 is an explanatory diagram that illustrates averaging by the optical transmission system according to the modified example. As illustrated in FIG. 13, the receiving units 20 (Rx1, Rx2, Rx3, and Rx4) obtain shifts (Δλ1, Δλ2, Δλ3, and Δλ4) of the optical signal (λ1) due to the operations (Steps S1, S3, S4, and S7) of the transponder T on the receiving side as illustrated in FIG. 5. Then, wavelength shift information 12 that indicates the obtained shifts (Δλ1 to Δλ4) of the optical signal is transmitted to Tx1. Tx1 performs an averaging operation (the average value=(Δλ1+Δλ2+Δλ3+Δλ4)/4) on the basis of the wavelength shift information 12 from Rx1 to Rx4. Then, the control unit 30 controls the wavelength of the variable-wavelength light source 105 on the basis of the obtained average value. Thus, the optical transmission system 1a makes it possible to reduce errors due to the individual variability of the narrow-band variable-wavelength filter 211 on the receiving side.

According to one aspect, a wavelength displacement of an optical signal can be adjusted with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system comprising:
   a transmitting device that transmits optical signals; and
   a receiving device that receives the optical signals, wherein
   the transmitting device includes a modulating unit that changes a frequency of the optical signal, and
   the receiving device includes
      a filtering unit that passes an optical signal in a predetermined frequency band among the received optical signals;
      a measuring unit that measures an intensity of an optical signal that passes through the filtering unit;
      a detecting unit that detects a center wavelength of the optical signal in accordance with an intensity of the optical signal that is measured when a frequency of the optical signal is changed in a state where a band in which the filtering unit passes the optical signal is set to a predetermined frequency band that corresponds to the optical signal; and
      an output unit that outputs information that indicates the detected center wavelength to the transmitting device, wherein
   the transmitting device controls a wavelength of the optical signal in accordance with the information that is output from the receiving device.

2. The optical transmission system according to claim 1, wherein
   the modulating unit changes a frequency of the optical signal by using a different frequency for each channel, and
   the detecting unit detects the center wavelength of each channel of the optical signal in accordance with the measured intensity of each channel of the optical signal in a state where a band in which the filtering unit passes the optical signal is set for each channel of the optical signal.

3. The optical transmission system according to claim 1, wherein, when the detecting unit detects a center wavelength of the optical signal, the filtering unit sets a band in which the optical signal is passed to a frequency band that corresponds to an edge position of a frequency spectrum of the optical signal.

4. The optical transmission system according to claim 1, wherein the detecting unit detects a displacement direction of a center wavelength of the optical signal with respect to a predetermined wavelength in accordance with a degree of the measured intensity of the optical signal with regard to a predetermined setting value.

5. The optical transmission system according to claim 1, wherein the detecting unit detects a degree of displacement of a center wavelength of the optical signal with respect to a predetermined wavelength in accordance with a difference between a predetermined setting value and the measured intensity of the optical signal.

6. The optical transmission system according to claim 1, wherein the output unit outputs, to the transmitting device, information that indicates the detected center wavelength by changing a frequency of an optical signal that is to be output to the transmitting device.

7. The optical transmission system according to claim 1, wherein the output unit outputs, to the transmitting device, the information that indicates the detected center wavelength such that the information is included in an Optical Service Channel (OSC) signal that is to be output to the transmitting device.

8. The optical transmission system according to claim 1, wherein the transmitting device controls a wavelength of the optical signal in accordance with an average of information that is output from the multiple receiving devices, an optical signal transmitted by the transmitting device being received by the receiving devices.

9. An optical transmission device that transmits and receives optical signals, the optical transmission device comprising:
- a filtering unit that passes an optical signal in a predetermined frequency band among the received optical signals;
- a measuring unit that measures an intensity of an optical signal that passes through the filtering unit;
- a detecting unit that detects a center wavelength of the received optical signal in accordance with an intensity of the optical signal that is measured when a frequency of the received optical signal is changed in a state where a band in which the filtering unit passes the optical signal is set to a predetermined frequency band that corresponds to the received optical signal;
- an output unit that outputs information that indicates the detected center wavelength to a transmitting device of the received optical signal; and
- a control unit that controls a wavelength of the optical signal to be transmitted in accordance with information that indicates the center wavelength and that is output from a receiving device of the optical signal when a frequency of the optical signal to be transmitted is changed.

10. The optical transmission device according to claim 9, wherein the detecting unit detects the center wavelength of each channel of the optical signal in accordance with the measured intensity of each channel of the optical signal in a state where a band in which the filtering unit passes the optical signal is set for each channel of the optical signal.

11. The optical transmission device according to claim 9, wherein, when the detecting unit detects a center wavelength of the optical signal, the filtering unit sets a band in which the optical signal is passed to a frequency band that corresponds to an edge position of a frequency spectrum of the optical signal.

12. The optical transmission device according to claim 9, wherein the detecting unit detects a displacement direction of a center wavelength of the optical signal with respect to a predetermined wavelength in accordance with a degree of the measured intensity of the optical signal with regard to a predetermined setting value.

13. The optical transmission device according to claim 9, wherein the detecting unit detects a degree of displacement of a center wavelength of the optical signal with respect to a predetermined wavelength in accordance with a difference between a predetermined setting value and the measured intensity of the optical signal.

14. The optical transmission device according to claim 9, wherein the output unit outputs, to the transmitting device, information that indicates the detected center wavelength by changing a frequency of an optical signal that is to be output to the transmitting device.

15. The optical transmission device according to claim 9, wherein the output unit outputs, to the transmitting device, the information that indicates the detected center wavelength such that the information is included in an Optical Service Channel (OSC) signal that is to be output to the transmitting device.

16. The optical transmission device according to claim 9, wherein the control unit controls a wavelength of an optical signal in accordance with an average of information that is output from the multiple receiving devices, the optical signal transmitted by the optical transmission device being received by the receiving devices.

* * * * *